(12) United States Patent
Bohnet et al.

(10) Patent No.: US 7,686,552 B2
(45) Date of Patent: Mar. 30, 2010

(54) FIXING DEVICE FOR PRODUCING AN ANCHORING IN PANELS, ESPECIALLY PANELS CONSISTING OF GLASS

(75) Inventors: Hartmut Bohnet, Waldachtal (DE); Roland Unterweger, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/560,456

(22) PCT Filed: Aug. 25, 2004

(86) PCT No.: PCT/EP2004/009463

§ 371 (c)(1),
(2), (4) Date: Dec. 14, 2005

(87) PCT Pub. No.: WO2005/028777

PCT Pub. Date: Mar. 31, 2005

(65) Prior Publication Data

US 2007/0071572 A1 Mar. 29, 2007

(30) Foreign Application Priority Data

Sep. 4, 2003 (DE) ................. 103 40 720

(51) Int. Cl.
*F16B 13/00* (2006.01)
*E06B 3/54* (2006.01)
(52) U.S. Cl. ...................... 411/82; 52/204.7

(58) Field of Classification Search ............ 411/82, 411/82.1, 914, 930, 107, 903; 52/207.4; 248/200, 304
See application file for complete search history.

(56) References Cited

U.S. PATENT DOCUMENTS 846,493 A * 3/1907 Mallon ................. 40/124.5
(Continued)

FOREIGN PATENT DOCUMENTS

AU 13144/88 9/1989
(Continued)

OTHER PUBLICATIONS

International Search Report for corresponding PCT/EP2004/009463, mailed, Dec. 28, 2004.
(Continued)

*Primary Examiner*—Flemming Saether
(74) *Attorney, Agent, or Firm*—Renner, Otto, Boisselle & Sklar, LLP

(57) ABSTRACT

A fixing device is provided for anchoring in an undercut drilled hole in a panel, especially a glass panel, having an anchor bolt. The anchor bolt has fixing means and an anchoring zone having a portion that widens in cross-section in the direction of insertion. In order to provide such a fixing device having increased resilience, the invention proposes that the anchor bolt having a covering of a resilient plastics material in the region of the anchoring zone and that the anchor bolt be anchored by means of a curable composition.

12 Claims, 1 Drawing Sheet

U.S. PATENT DOCUMENTS

| | | | | |
|---|---|---|---|---|
| 3,309,123 A | * | 3/1967 | Edwards | 264/80 |
| 4,642,964 A | * | 2/1987 | Kellison | 52/699 |
| 4,680,206 A | * | 7/1987 | Yoxon et al. | 428/34 |
| 4,689,928 A | * | 9/1987 | Dutton et al. | 52/235 |
| 4,793,112 A | | 12/1988 | Süfke | |
| 4,840,524 A | * | 6/1989 | Bisping et al. | 411/82 |
| 4,983,083 A | * | 1/1991 | Froehlich et al. | 411/82.1 |
| 5,106,250 A | * | 4/1992 | Fischer et al. | 411/107 |
| 5,315,800 A | | 5/1994 | Weber et al. | |
| 5,328,300 A | * | 7/1994 | Fischer et al. | 405/259.6 |
| 5,490,365 A | * | 2/1996 | Roth | 52/704 |
| 5,497,586 A | * | 3/1996 | Dodd et al. | 52/172 |
| 5,540,514 A | * | 7/1996 | Demars et al. | 403/388 |
| 5,562,377 A | * | 10/1996 | Giannuzzi et al. | 411/82 |
| 5,787,662 A | | 8/1998 | Danz | |
| 6,430,894 B1 | * | 8/2002 | Chae et al. | 52/786.1 |
| 6,519,903 B1 | | 2/2003 | Dirisamer et al. | |
| 6,632,056 B1 | * | 10/2003 | Lind | 411/107 |
| 6,735,921 B2 | * | 5/2004 | Oberhofer et al. | 52/786.1 |
| 6,938,385 B2 | * | 9/2005 | Lind | 52/204.7 |

FOREIGN PATENT DOCUMENTS

| | | |
|---|---|---|
| DE | 37 08 764 C2 | 9/1988 |
| DE | 40 01 297 A1 | 7/1991 |
| DE | 41 21 620 A1 | 1/1993 |
| DE | 43 34 286 C2 | 4/1995 |
| DE | 298 20 560 U1 | 4/2000 |
| EP | 0 314 120 | 5/1989 |
| WO | 01/09459 A1 | 2/2001 |
| WO | 02/02899 A1 | 1/2002 |

OTHER PUBLICATIONS

German Search Report for corresponding Application No. 103 40 702.0 mailed Sep. 4, 2003.

* cited by examiner

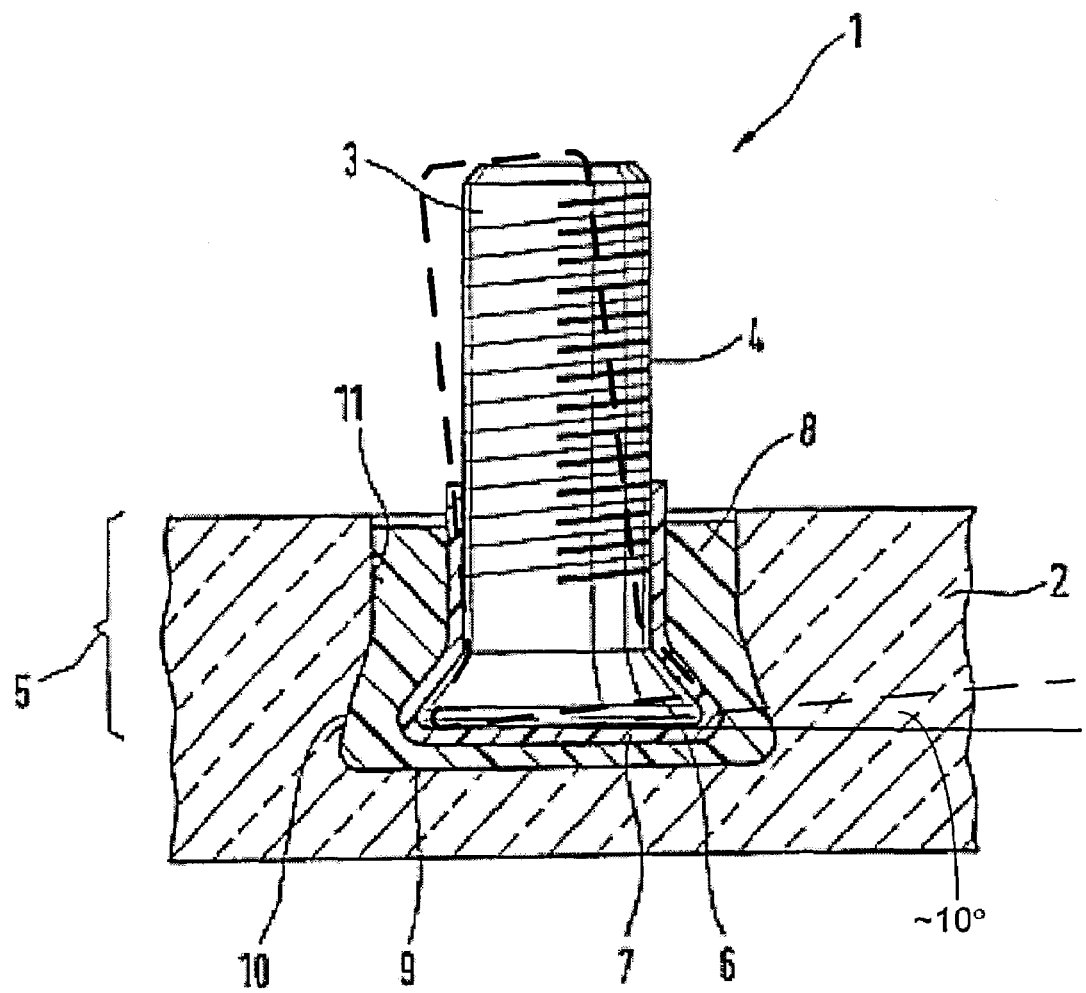

FIXING DEVICE FOR PRODUCING AN ANCHORING IN PANELS, ESPECIALLY PANELS CONSISTING OF GLASS

TECHNICAL FIELD OF THE INVENTION

The invention relates to a fixing device for producing an anchoring in panels, especially panels consisting of glass.

DESCRIPTION OF THE RELATED ART

The specification DE 43 34 286 C2 discloses a fixing element which is used especially for the fixing of glass panels. It consists of an anchor bolt and an expansion element, the expansion element being anchorable in a drilled hole having an undercut by being drawn into and/or pushed onto the expander cone of the anchor bolt. Between the expansion element and the wall of the undercut drilled hole there is arranged a pressing element of soft plastics material. This has the effect that the holding forces do not give rise to excessive point loads in the drilled hole, such as could not be ruled out in the case of direct contact between metal and glass.

A problem of such anchorings is that they have little flexibility. Particularly during mounting and as a result of thermally induced changes in length in the installed state, considerable transverse forces and bending moments can arise unless this is counteracted by elaborate measures, for example in the region of the supporting structure.

The problem underlying the invention is therefore to provide a fixing device, suitable especially for the fixing of glass panels, that exhibits increased resilience.

SUMMARY OF THE INVENTION

The fixing device according to the invention provides an anchoring not by means of expansion but by means of a curable composition, for example an epoxy resin, polyester resin or a mortar. The anchor bolt is surrounded in the region of its anchoring zone with a covering, of a resilient plastics material. This provides the fixing element with resilience in all directions. This also has the effect that the anchor bolt has no contact with the wall of the drilled hole at any point. Without the covering, such contact could occur, for example, as the result of the anchor bolt's being positioned off-centre or hitting the base of the drilled hole while the composition is curing. Whereas such contact can result in the mentioned point loads, a resilient covering ensures distribution over an area.

A decisive factor for the holding values achievable by the fixing, in addition to the design of the anchor bolt, is, especially, the geometry of the drilled hole. In order that a curable composition can enter into a firm bond in a drilled hole, it must result in an interlocking connection in addition to its adhesive actions. It is particularly the case with drilled holes in glass, which are typically drilled with diamond drills, that undercuts suitable for this purpose are not obtained to any extent in cylindrical drilled holes as a result of the very smooth surface. It is therefore necessary specially to introduce an undercut by rotating the drill or the like. Without departing from the inventive concept, however, such undercuts can also be in the form of irregular grooves, circumferential channels or any other kind of surface irregularity.

The resilience of the fixing device can be controlled, on the one hand, by the thickness and, on the other hand, by the modulus of elasticity of the plastics material used. The wider the covering, the greater the displacements, for example caused by thermal expansions, that can be compensated. Preferably, however, the thickness of the covering is so chosen that the smallest outer diameter of the covering is smaller than the maximum diameter of the anchoring zone of the anchor bolt. As a result, the anchor bolt cannot be pulled out of the drilled hole simply as a result of the covering's shearing off along a cylindrical surface.

Advantageously, the covering contains silicone as a constituent, because silicone has proved to be suitable as a resistant, lastingly resilient material for this application.

BRIEF DESCRIPTION OF THE DRAWING

FIGURE is a sectional view of a fixing device in accordance with an exemplary embodiment of the present invention.

DETAILED DESCRIPTION OF THE EMBODIMENTS

The invention is described in greater detail below with reference to an exemplary embodiment shown in the drawing. The FIGURE shows a sectional view of a fixing device 1 according to the invention for fixing a glass panel 2. The fixing element has an anchor bolt 3 with an external thread 4 as fixing means and an anchoring zone 5 having a portion 6 that widens conically in cross-section in the direction of insertion. The external thread 4 can be used for attachment to a supporting structure (not shown), for example with the aid of nuts, washers or the like. The anchoring zone 5 has a silicone-containing covering 7 which is surrounded by a cured composition 8. The drilled hole 9 has a conical undercut 10 which prevents the cured composition 8 from being capable of being pulled out of the drilled hole 9 through detachment from the wall 11 of the drilled hole. The thickness of the covering 7 is so chosen that the portion of widened cross-section 6 of the anchoring zone 5 forms an undercut in the cured composition 8 independently of the covering. As a result, the anchor bolt 3 cannot be pulled out of the cured composition 8 even when the covering 7 has been completely displaced. Displacements in all directions of about twice the thickness of the covering and an inclination of about 10 degrees are nevertheless possible, as depicted by the broken line in the FIGURE representing such displacement of the anchor bolt.

For anchoring by means of the fixing device 1, once the undercut drilled hole 9 has been made, the composition 8 is introduced. Before the composition has cured, the anchor bolt 3 is inserted into the drilled hole 9. The composition 8 is thereby displaced and is distributed around the anchor bolt 3. Central positioning is not necessary for this, but if such positioning is desirable for reasons of precise attachment to a supporting structure, the covering 7 can additionally have, at its end remote from the anchoring zone 5, a peripheral collar, ribs or the like (not shown) which provides for centering and/or serves as an axial stop in the drilled hole 9.

The invention claimed is:

1. A fixing device anchored in an undercut drilled hole drilled only partially into an undercut portion of a panel, the fixing device comprising:
    an anchor bolt comprising fixing means for fixing the panel to a supporting structure, and an anchoring zone having a portion that widens in cross-section in a direction of insertion and in correspondence with the undercut portion, and
    a covering of a resilient plastics material that covers the anchoring zone and has a thickness and resiliency such that when the fixing device is anchored within the undercut portion, the covering permits inclination of the anchor bolt relative to the undercut portion of about ten degrees in response to transverse forces, wherein an outermost cross-sectional dimension of the resilient material is less than an innermost cross-sectional dimension of the undercut hole.

2. A fixing device according to claim 1, wherein a smallest outer diameter of the covering is smaller in diameter than the portion of the anchoring zone that widens in cross-section.

3. A fixing device according to claim 1, wherein the covering comprises a silicone-containing plastics material.

4. A fixing device according to claim 1, wherein the covering consists of a silicone-containing plastics material.

5. A fixing arrangement comprising:
a panel having an undercut drilled hole extending only partially through the panel and comprising an undercut portion; and
a fixing device anchored in the undercut portion, the fixing device comprising an anchor bolt having fixing means for fixing the panel to a supporting structure and an anchoring zone having a portion that widens in cross-section in a direction of insertion and in correspondence with the undercut portion, and a covering of a resilient plastics material that covers the anchoring zone, wherein an outermost cross-sectional dimension of the resilient material is less than an innermost cross-sectional dimension of the undercut hole, and
wherein the covering has a thickness and resiliency such that the covering permits inclination of the anchor bolt relative to the undercut portion in response to transverse forces.

6. A fixing arrangement according to claim 5, wherein a smallest outer diameter of the covering is smaller in diameter than the portion of the anchoring zone that widens in cross-section.

7. A fixing arrangement according to claim 5, wherein the covering comprises a silicone-containing plastics material.

8. A fixing arrangement according to claim 5, wherein the covering consists of a silicone-containing plastics material.

9. A fixing arrangement according to claim 5, wherein inclination of the anchor bolt of about 10 degrees relative to the undercut portion is enabled.

10. A fixing arrangement according to claim 5, wherein the fixing device is anchored in the undercut portion by a curable compound.

11. A fixing arrangement according to claim 5, wherein the panel is a glass panel.

12. A fixing arrangement comprising:
a panel having an undercut drilled hole extending only partially through the panel and comprising an undercut portion; and
a fixing device anchored in the undercut portion, the fixing device comprising an anchor bolt having fixing means for fixing the panel to a supporting structure and an anchoring zone having a portion that widens in cross-section in a direction of insertion and in correspondence with the undercut portion, and a covering of a resilient plastics material that covers the anchoring zone,
wherein the covering has a thickness and resiliency such that the covering permits inclination of the anchor bolt relative to the undercut portion in response to transverse forces; and
wherein the fixing device is anchored in the undercut portion by a curable compound.

* * * * *